(12) United States Patent
Tan

(10) Patent No.: US 12,008,200 B1
(45) Date of Patent: Jun. 11, 2024

(54) CAPACITIVE SCAN METHOD WITHOUT DISPLAY FLICKER

(71) Applicant: STMicroelectronics International N.V., Geneva (CH)

(72) Inventor: Kien Beng Tan, Singapore (SG)

(73) Assignee: STMicroelectronics International N.V., Geneva (CH)

( * ) Notice: Subject to any disclaimer, the term of this patent is extended or adjusted under 35 U.S.C. 154(b) by 0 days.

(21) Appl. No.: 18/169,000

(22) Filed: Feb. 14, 2023

(51) Int. Cl.
*G06F 3/041* (2006.01)
*G06F 3/044* (2006.01)

(52) U.S. Cl.
CPC ........ *G06F 3/04184* (2019.05); *G06F 3/0446* (2019.05)

(58) Field of Classification Search
CPC ............................ G06F 3/04184; G06F 3/0446
See application file for complete search history.

(56) References Cited

U.S. PATENT DOCUMENTS

| 9,235,280 | B1 | 1/2016 | Mohindra | |
|---|---|---|---|---|
| 9,746,970 | B2 | 8/2017 | Krenik et al. | |
| 10,126,889 | B2 | 11/2018 | Westhues et al. | |
| 2016/0004357 | A1* | 1/2016 | Westhues | G06F 3/04182 |
| | | | | 345/174 |
| 2016/0070387 | A1* | 3/2016 | Park | G06F 3/0446 |
| | | | | 345/174 |
| 2016/0188085 | A1* | 6/2016 | Leigh | G06F 3/0418 |
| | | | | 345/174 |
| 2016/0313823 | A1 | 10/2016 | Tan | |
| 2021/0055822 | A1* | 2/2021 | Small | G06F 3/04166 |
| 2021/0141476 | A1* | 5/2021 | Dong | H10K 59/131 |
| 2021/0211129 | A1* | 7/2021 | Muranaka | G06F 3/04166 |

* cited by examiner

*Primary Examiner* — Liliana Cerullo
(74) *Attorney, Agent, or Firm* — Slater Matsil, LLP

(57) ABSTRACT

A method for operating a touch sensing panel includes a touchscreen controller determining a first plurality of excitation signals in accordance with a first plurality of codes, wherein a sum of the first plurality of codes is a sequence of numbers having a same absolute value and signs alternating between adjacent numbers in the sequence of numbers. The method further includes the touchscreen controller transmitting each of the first plurality of excitation signals to a respective transmitting (TX) touch sensor of the touch sensing panel simultaneously during a first time frame. The method further includes the touchscreen controller determining touch strengths in accordance with a first plurality of output signals received by a plurality of receiving (RX) touch sensors of the touch sensing panel during the first time frame.

21 Claims, 8 Drawing Sheets

Code 1 = 1, -1, 1, 1, 1, 1, -1, 1

Code 2 = -1, -1, 1, -1, -1, -1, -1, 1

Code 3 = -1, 1, 1, -1, 1, 1, 1, 1

Code 4 = -1, 1, -1, -1, 1, -1, -1, -1

Code 5 = 1, 1, -1, 1, 1, -1, 1, 1

Code 6 = -1, -1, -1, 1, -1, -1, 1, -1

Code 7 = 1, 1, 1, 1, -1, 1, 1, -1

Code 8 = 1, -1, -1, -1, -1, 1, -1, -1

Sum    = 0, 0, 0, 0, 0, 0, 0, 0

```
Code 1 =  1, -1,  1,  1,  1,  1, -1,  1
Code 2 = -1, -1,  1, -1, -1, -1, -1,  1
Code 3 = -1,  1,  1, -1,  1,  1,  1,  1
Code 4 = -1,  1, -1, -1,  1, -1, -1, -1
Code 5 =  1,  1, -1,  1,  1, -1,  1,  1
Code 6 = -1, -1, -1,  1, -1, -1,  1, -1
Code 7 =  1,  1,  1,  1, -1,  1,  1, -1
Code 8 =  1, -1, -1, -1, -1,  1, -1, -1
─────────────────────────────────────────
Sum    =  0,  0,  0,  0,  0,  0,  0,  0
```

FIG. 3

```
Code 1 =  1,  1,  1, -1, -1, -1,  1, -1
Code 2 =  1, -1, -1, -1,  1,  1,  1, -1
Code 3 =  1, -1,  1,  1,  1, -1, -1, -1
Code 4 =  1, -1,  1, -1, -1, -1,  1,  1
Code 5 = -1, -1,  1, -1,  1,  1,  1, -1
Code 6 =  1,  1,  1, -1,  1, -1, -1, -1
Code 7 =  1, -1, -1, -1,  1, -1,  1,  1
Code 8 = -1, -1,  1,  1,  1, -1,  1, -1
─────────────────────────────────────────
Sum    =  4, -4,  4, -4,  4, -4,  4, -4
```

FIG. 4A

Code 1 = -1, -1, -1, -1, -1, 1, -1, -1, 1, 1, 1, -1, -1, 1, -1, 1
Code 2 = -1, 1, 1, 1, 1, 1, -1, 1, 1, -1, -1, -1, 1, 1, -1, 1
Code 3 = -1, 1, -1, -1, -1, -1, -1, 1, -1, -1, 1, 1, 1, -1, -1, 1
Code 4 = -1, 1, -1, 1, 1, 1, 1, 1, -1, 1, 1, -1, -1, -1, 1, 1
Code 5 = -1, 1, -1, 1, -1, -1, -1, -1, -1, 1, -1, -1, 1, 1, 1, -1
Code 6 = 1, 1, -1, 1, -1, 1, 1, 1, 1, 1, -1, 1, 1, -1, -1, -1
Code 7 = 1, -1, -1, 1, -1, 1, -1, -1, -1, -1, -1, 1, -1, -1, 1, 1
Code 8 = -1, -1, 1, 1, -1, 1, -1, 1, 1, 1, 1, 1, -1, 1, 1, -1
Code 9 = 1, 1, 1, -1, -1, 1, -1, 1, -1, -1, -1, -1, -1, 1, -1, -1
Code 10 = 1, -1, -1, -1, 1, 1, -1, 1, -1, 1, 1, 1, 1, 1, -1, 1
Code 11 = -1, -1, 1, 1, 1, -1, -1, 1, -1, 1, -1, -1, -1, -1, -1, 1
Code 12 = -1, 1, 1, -1, -1, -1, 1, 1, -1, 1, -1, 1, 1, 1, 1, 1
Code 13 = -1, 1, -1, -1, 1, 1, 1, -1, -1, 1, -1, 1, -1, -1, -1, -1
Code 14 = 1, 1, -1, 1, 1, -1, -1, -1, 1, 1, -1, 1, -1, 1, 1, 1
Code 15 = -1, -1, -1, 1, -1, -1, 1, 1, 1, -1, -1, 1, -1, 1, -1, -1
Code 16 = 1, 1, 1, 1, -1, 1, 1, -1, -1, -1, 1, 1, -1, 1, -1, 1

Sum   = -4, 4, -4, 4, -4, 4, -4, 4, -4, 4, -4, 4, -4, 4, -4, 4

FIG. 4B

Code 1 = -1, -1, -1, -1, -1, 1, -1, 1, -1, -1, -1, 1, 1, -1, 1, 1
Code 2 = -1, 1, 1, 1, 1, 1, 1, -1, -1, 1, 1, 1, -1, -1, 1, -1
Code 3 = 1, 1, -1, -1, -1, -1, -1, 1, -1, 1, -1, -1, -1, 1, 1, -1
Code 4 = 1, -1, -1, 1, 1, 1, 1, 1, -1, 1, -1, 1, 1, 1, -1, -1
Code 5 = 1, -1, 1, 1, -1, -1, -1, -1, -1, 1, -1, 1, -1, -1, -1, 1
Code 6 = -1, -1, 1, -1, -1, 1, 1, 1, 1, 1, -1, 1, -1, 1, 1, 1
Code 7 = -1, 1, 1, -1, 1, 1, -1, -1, -1, -1, -1, 1, -1, 1, -1, -1
Code 8 = 1, 1, -1, -1, 1, -1, -1, 1, 1, 1, 1, 1, -1, 1, -1, 1
Code 9 = -1, -1, -1, 1, 1, -1, 1, 1, -1, -1, -1, -1, -1, 1, -1, -1
Code 10 = -1, 1, 1, 1, -1, -1, 1, -1, -1, 1, 1, 1, 1, 1, -1, 1
Code 11 = -1, 1, -1, -1, -1, 1, 1, -1, 1, 1, -1, -1, -1, -1, -1, 1
Code 12 = -1, 1, -1, 1, 1, 1, -1, -1, 1, -1, -1, 1, 1, 1, 1, 1
Code 13 = -1, 1, -1, 1, -1, -1, -1, 1, 1, -1, 1, 1, -1, -1, -1, -1
Code 14 = 1, 1, -1, 1, -1, 1, 1, 1, -1, -1, 1, -1, -1, 1, 1, 1
Code 15 = -1, -1, -1, 1, -1, 1, -1, -1, -1, 1, 1, -1, 1, 1, -1, -1
Code 16 = 1, 1, 1, 1, -1, 1, -1, 1, 1, 1, -1, -1, 1, -1, -1, 1

Sum    = -4, 4, -4, 4, -4, 4, -4, 4, -4, 4, -4, 4, -4, 4, -4, 4

FIG. 4C

CAPACITIVE SCAN METHOD WITHOUT DISPLAY FLICKER

TECHNICAL FIELD

The present invention relates generally to systems and methods for operating a touchscreen, and in particular embodiments to systems and methods for reducing display flickers caused by touch scans.

BACKGROUND

Electronic devices that are designed for user interaction have historically utilized external input devices such as keyboards, key pads, and mice to capture user input. In recent years, there has been a push from the more traditional methods, as consumers prefer the convenience of portable devices that can support a more flexible lifestyle. To this end, there has been a rise in smaller, portable, hand-held electronic devices, such as mobile phones, tablets, gaming systems, smart watches, and any other wearable electronic devices, etc. This has given rise to the popularity of touchscreens and touch panel displays as systems for capturing user input. Not only do they provide the functionality of the traditional electronic devices, but touchscreens provide additional features. For example, given the appropriate software, users are able to utilize touchscreens for sketching, drawing, and various hand writing applications.

Today's display technologies offer a higher performance display. A way to improve brightness of the display is to reduce the thickness of stack above a display panel. However, thinner stack may increase the coupling capacitance between a touch panel and the display panel. Display panels may be based on active matrix technology. This means that there is a circuit to drive each pixel and the circuit requires power supplies. A low impedance connection to power source may be required. Hence, the connection is a large plane. The coupling capacitance between the touch panel and the display power plane may interfere display performance. Thus, sensing scans to detect touch (also referred to as touch scans) on the touchscreen may cause noticeable display flickers because signals generated during the touch scans may interfere with control signals and image data transmitted by the display layer. Therefore, techniques to solve such display flicker issues are desired.

SUMMARY

In accordance with an embodiment, a method for operating a touch sensing panel includes a touchscreen controller determining a first plurality of excitation signals in accordance with a first plurality of codes, wherein a sum of the first plurality of codes is a sequence of numbers having a same absolute value and signs alternating between adjacent numbers in the sequence of numbers. The method further includes the touchscreen controller transmitting each of the first plurality of excitation signals to a respective transmitting (TX) touch sensor of the touch sensing panel simultaneously during a first time frame. The method further includes the touchscreen controller determining touch strengths in accordance with a first plurality of output signals received by a plurality of receiving (RX) touch sensors of the touch sensing panel during the first time frame.

In accordance with an embodiment, a touchscreen controller coupled to a touch sensing panel includes a TX circuit configured to transmit a first plurality of excitation signals to a plurality of TX touch sensors of the touch sensing panel simultaneously during a first time frame, wherein the first plurality of excitation signals is determined in accordance with a first plurality of codes, and wherein a sum of the first plurality of codes is a sequence of numbers having a same absolute value and signs alternating between adjacent numbers in the sequence of numbers. The touchscreen controller further includes a RX circuit configured to receive a first plurality of output signals from a plurality of RX touch sensors of the touch sensing panel during the first time frame, wherein the touchscreen controller is configured to determine touch strengths in accordance with the first plurality of output signals.

In accordance with an embodiment, an electronic device includes a touch sensing panel including a plurality of TX touch sensors and a plurality of RX touch sensors. The electronic device further includes a touchscreen controller coupled to the touch sensing panel. The touchscreen controller includes a TX circuit configured to transmit a first plurality of excitation signals to the plurality of TX touch sensors simultaneously during a first time frame, wherein the first plurality of excitation signals is determined in accordance with a first plurality of codes, and wherein a sum of the first plurality of codes is a sequence of numbers having a same absolute value and signs alternating between adjacent numbers. The touchscreen controller further includes a RX circuit configured to receive a first plurality of output signals from the plurality of RX touch sensors during the first time frame, wherein the touchscreen controller is configured to determine touch strengths in accordance with the first plurality of output signals.

BRIEF DESCRIPTION OF THE DRAWINGS

For a more complete understanding of the present invention, and the advantages thereof, reference is now made to the following descriptions taken in conjunction with the accompanying drawings, in which:

FIG. 3 illustrates how to generate the excitation signals based on multiple codes according to some embodiments;

FIGS. 4A-4C illustrate examples of the codes configured to generate the excitation signals according to some embodiments;

DETAILED DESCRIPTION OF ILLUSTRATIVE EMBODIMENTS

Figure 1A:
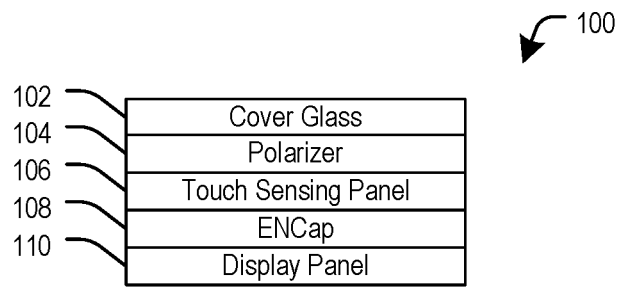
FIG. 1A illustrates a stack-up diagram of a conventional display.

The making and using of various embodiments are discussed in detail below. It should be appreciated, however, that the various embodiments described herein are applicable in a wide variety of specific contexts. The specific embodiments discussed are merely illustrative of specific ways to make and use various embodiments, and should not be construed in a limited scope.

Reference to "an embodiment" or "one embodiment" in the framework of the present description is intended to indicate that a particular configuration, structure, or characteristic described in relation to the embodiment is included in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments. The references used herein are provided merely for convenience and hence do not define the extent of protection or the scope of the embodiments.

While today's touchscreens have led to great advances in the evolution of portable devices, limitations still exist. For example, conventional organic light emitting diode (OLED) touchscreens may include a touch sensing panel and a plurality of pixels arranged in rows and columns across a display panel in a matrix like formation. Each pixel may include an OLED configured to generate light based on the current driven through it. In operation, an OLED display may be refreshed (e.g., updated) in each of a plurality of display frames defined by a vertical synchronization signal (VSYNC). During each display frame, each row of pixels are updated sequentially according to a horizontal synchronization signal (HSYNC) signal and touch sensing scans (e.g., mutual and self-sensing scans) are performed. Problematically, however, a parasitic capacitance is present between the touch panel and display panel. Thus, touch sensing scans may cause interference to the display when they are performed while the display is updated. In such cases, especially as OLED touchscreens are becoming thinner, this interference may result in a dimming of the light illuminated by the OLEDs and result in noticeable display flickers.

Embodiments of the present application relate to reducing the interference to the display panel caused by excitation signals transmitted from the transmitting (TX) touch sensors of the touch sensing panel. In an embodiment, a method for operating a touch sensing panel includes a touchscreen controller that determines a plurality of excitation signals in accordance with a plurality of codes. The plurality of codes is designed such that a sum of the plurality of codes is a sequence of numbers. The integers in the sequence have the same absolute value, but their signs are alternating between adjacent numbers. The method further includes the touchscreen controller transmitting each of the plurality of excitation signals to a respective TX touch sensor of the touch sensing panel simultaneously during a time frame. The method further includes the touchscreen controller determining touch strengths in accordance with a plurality of output signals received by a plurality of receiving (RX) touch sensors of the touch sensing panel during the time frame. The above aspects and other inventive aspects are discussed in greater detail below.

Although in this disclosure some embodiments are described in the context of an OLED display, it should be appreciated that such embodiments are not so limited and are equally applicable to a touchscreen display implemented using any other display technologies such as liquid-crystal display (LCD).

FIG. 1A illustrates a stack-up diagram of a conventional display 100. The display 100 may be an organic light emitting diode (OLED) display or any other type of display integrated with a touch sensing function. The display 100 may also be referred to as a touchscreen, a touchscreen display or a touch display. The display 100 may include a stack-up of a plurality of different layers. As a non-limiting example, the display 100 may comprise a cover glass layer 102, a polarizer film layer 104, a touch sensing panel 106, an encapsulation film layer 108, and a display panel 110. The display panel 110 may comprise a plurality of pixel elements formed across rows and columns of the display 100 in an array like formation. The pixel elements may be OLED and may be configured to transmit light having a color (such as red, green, or blue) with a brightness based on the current they are driven with. The pixel elements may also be implemented based on non-OLED techniques. The encapsulation film layer 108 may be formed in direct contact with the display panel 110. The encapsulation film 120 may function to prevent oxygen, water, or moisture from external sources reaching into and damaging the display panel 110. The touch sensing panel 106 may be a capacitive touch panel configured to detect touches made on the display 100. The touch sensing panel 106 may include a plurality of touch sensing electrodes formed of a conductive material (which may also be referred to as touch sensors). The touch sensing electrodes may be deposited and attached onto the encapsulation film 120 (e.g., in an on-cell type display). Alternatively, the touch sensing electrodes may be printed or fabricated with the encapsulation film 120 (e.g., in an in-cell type display). The polarizer film layer 104 may be used for controlling the characteristics of the display 100 such as external light reflection, color accuracy, luminance, and so on. The cover glass layer 102 may be a protective layer to protect the display 100. The cover glass layer 102 may comprise a transparent material such as a thin layer of glass including silicon dioxide. Additional layers known in the art may also be included in the display 100.

Figure 1C:
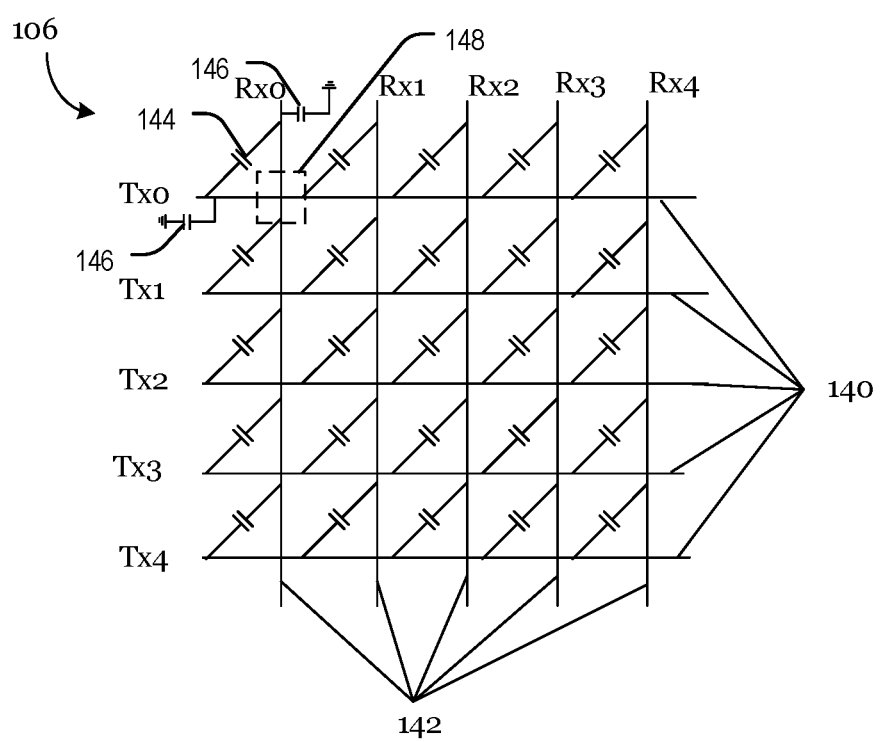
FIG. 1C illustrates a schematic of a touch sensing panel.
Figure 1B:
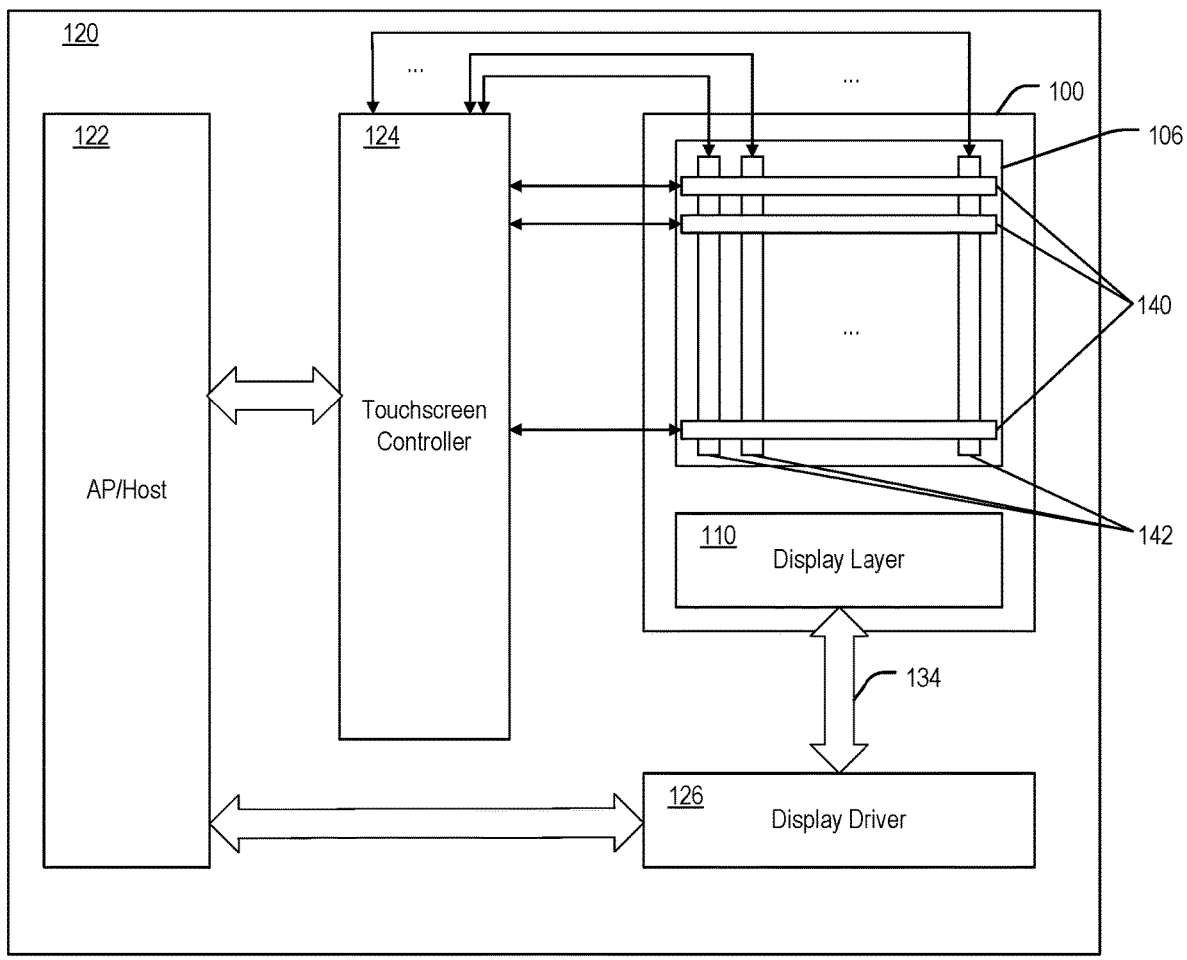
FIG. 1B is a block diagram of an electronic device according to some embodiments.

FIG. 1B is a block diagram of an electronic device 120 according to some embodiments. The electronic device 120 may include a display panel 100, a host 122, a touchscreen controller 124, and a display driver 126. The electronic device 120 may be a smart phone, a Global Positioning System (GPS) device, a tablet computer, a mobile media player, a laptop, a gaming system, a personal computer, or any other electronic device that may utilize a touchscreen display (such as the display panel 100).

The host 122, also referred to as a system on a chip or an application processor (AP), comprises a processor, interface, circuitry, and the like configured to direct the flow of input and output data to the touchscreen controller 124 and the display driver 126. For example, the host 122 may be the CPU of a smartphone. A memory may be coupled to or otherwise integrated with the host 122. The memory may be programmed for short term and/or long term memory storage. The memory may comprise various programs to be executed in the host 122. The memory may include both volatile and non-volatile memories. The host 122 may be configured to, e.g., transmit image data, updated display refresh rates, and/or synchronization signals to the display driver 126 and to receive touch related signals such as coordinates or touch control signals from the touchscreen controller 124.

The display panel 100 may include a touch sensing panel 106 and a display layer 110. The display layer 110 is configured to display an image in accordance with display signals 134 and synchronization signals (including a VSYNC signal and an HSYNC signal not shown in FIG. 1B) received from the display driver 126. The display driver 126 may perform various methods with respect to the display panel 100. In various embodiments, the display driver 126 may be a processor that analyzes information and carries out a series of executable scripts, e.g., stored in a memory integrated in the display driver 126. Alternatively, the display driver 126 and the touchscreen controller 124 may share a common memory. In one or more embodiments, the processor may comprise an application-specific integrated circuit (ASIC) device, a central processing unit (CPU), or any other processing unit known in the art. In various embodiments, the display driver 126 may refresh an image displayed on the display panel 100 based on a display refresh rate and/or synchronization signals received from the host 122. Optionally, the display driver 126 may transmit the VSYNC signal and the HSYNC signal to the touchscreen controller 124.

The touch sensing panel 106 in the display panel 100 is configured to detect touches made on the display panel 100. The touch sensing panel 106 may include transmitting (TX) touch sensors 140 and receiving (RX) touch sensors 142. The TX touch sensors may also be referred to as TX electrodes, TX channels, or drive lines. The RX touch sensors may also be referred to as RX electrodes, RX channels, or sense lines. The TX touch sensors 140 and RX touch sensors 142 may span the entirety of the display panel 100 or the touch sensing panel 106 in a grid-like fashion that are operable by the touchscreen controller 124. In various embodiments, the TX touch sensors 140 may be formed in rows across the touch sensing panel 106 and the RX touch sensors 142 may be formed in columns across the touch sensing panel 106. In other embodiments, the RX touch sensors 142 may be formed in rows across the touch sensing panel 106 and the TX touch sensors 140 may be formed in columns across the touch sensing panel 106. The TX touch sensors 140 and the RX touch sensors 142 may overlap in certain embodiments. While FIG. 1B depicts the TX touch sensors 140 and the RX touch sensors 142 overlapping in an orthogonal manner, they may overlap other than orthogonally such as being interleaved or at various angles. Although the linear shaped TX touch sensors 140 and RX touch sensors 142 are illustrated in FIG. 1B, this is merely one implementation example and is not indicative of any limitation to the shapes of touch sensors that may be present on the touch sensing panel 106. TX and RX touch sensors with any suitable shapes known in the art, such as serially connected diamond shapes, may be used in the touch sensing panel 106.

The touchscreen controller 124 may perform various methods with respect to the display panel 100. In various embodiments, the touchscreen controller 124 may be a processor that analyzes information and carries out a series of executable scripts, e.g., stored in a memory integrated in the touchscreen controller 124. For example, the memory may include non-volatile memory (such as read-only memory (ROM) or Flash) and random access memory (RAM). The memory integrated in the touchscreen controller 124 may store firmware that is determined in accordance with the series of executable scripts. In one or more embodiments, the processor may comprise an application-specific integrated circuit (ASIC) device, a central processing unit (CPU), or any other processing unit known in the art. In various embodiments, the touchscreen controller 124 may comprise a number of separate computing units such as cores integrated within one processor, or distinct separate processing chips.

FIG. 1C illustrates a schematic of the touch sensing panel 106. The touch sensing panel 106 may comprise TX touch sensors 140 (Tx0-Tx4) and RX touch sensors 142 (Rx0-Rx4) that span the entirety of the display panel 100 in a grid-like fashion that are operable by the touchscreen controller 124. The TX touch sensors 140 may also be referred to as drive lines, and the RX touch sensors 142 may also be referred to as sense lines. The TX touch sensors Tx0-Tx4 and RX touch sensors Rx0-Rx4 may be coupled to the touchscreen controller 124. Although five TX touch sensors and five RX touch sensors are illustrated in FIG. 1C, this is not indicative of the number of touch sensors that may be present on the touch sensing panel 106. Any suitable number of TX and RX touch sensors may be used in the touch sensing panel 106.

The TX touch sensors 140 and the RX touch sensors 142 may have a measurable mutual capacitance at their intersections 148 as to form a matrix of mutual capacitors with mutual capacitances 144. As appreciated by those with ordinary skill in the art, each of the TX touch sensors 140 and the RX touch sensors 142 may also have a self-capacitance 146 that is measurable. In other words, the TX touch sensors 140 and the RX touch sensors 142 are operable in mutual sensing mode and a self-sensing mode.

In one or more embodiments, the mutual sensing process includes the touchscreen controller 124 selecting and driving a particular row of the TX touch sensors 140 with an excitation signal and scanning and receiving an output signal from every column of the RX touch sensors 142. In this manner, the change in the mutual capacitance 144 at each intersection 148 between a respective TX touch sensor 140 and RX touch sensor 142 is measured, resulting in mutual sensing raw data. Each of the intersections 148 may be referred to as a touch node or a touch pixel. In one embodiment, this process is repeated sequentially for TX touch sensors 140 to determine the rest of the mutual sensing raw data. Then, after determining each value of the mutual sensing raw data, each value of the mutual sensing raw data may be subtracted from a corresponding baseline strength, resulting in touch strengths measured at each touch node 148. In another embodiment, the touch scan process may be operated in parallel, during which the touchscreen controller 124 may simultaneously transmit multiple excitation signals to the TX touch sensors 140. The parallel touch scan process may use distinguishable codes (such as orthogonal rows in a Hadamard matrix) to modulate each excitation signal so that the RX touch sensors 142 can identify each of the TX touch sensors 140.

In other words, during the mutual sensing scan when a row of the TX touch sensors 140 are driven, electric fields form between adjacent electrodes of the TX touch sensors 140 and the respective intersecting columns of the RX touch sensors 142. When capacitive objects such as human fingers or a stylus, touch a touch node 148 on the touch sensing panel 106, the electric field lines going through the air between adjacent lines is replaced to pass through the capacitive objects. These interruptions in the electric fields cause a detectable change in the mutual capacitance that can be quantified as mutual sensing raw data and may be converted into touch strengths by subtracting them from a corresponding baseline strength.

Figure 2A:
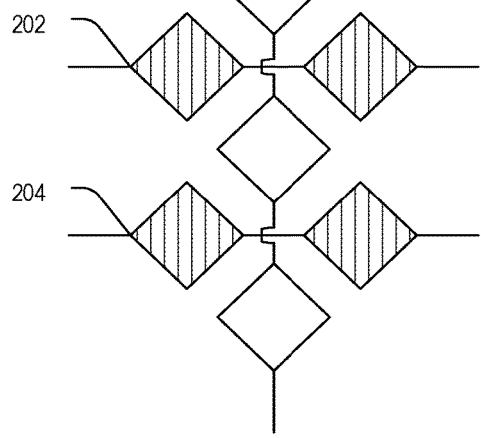
FIG. 2A depicts an example of a touch sensing panel according to some embodiments.

FIG. 2A depicts an illustrative example of a touch sensing panel 200 with two TX touch sensors 202 and 204 and one RX touch sensor 206. As shown in in FIG. 2A, the TX touch sensors 202 and 204 and the RX touch sensor 206 use serially connected diamond shapes.

Figure 2B:
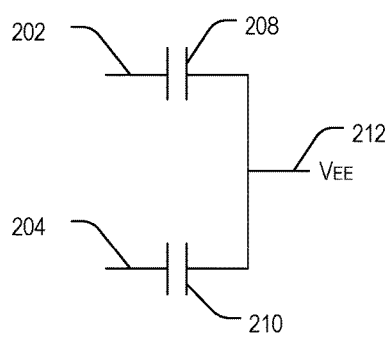
FIG. 2B depicts interferences to a display panel caused by the touch sensing panel.

FIG. 2B depicts interferences to a display panel caused by the touch sensing panel 200. A power supply terminal $V_{EE}$ 212 in the display panel may be coupled to both the TX touch sensor 202 and the TX touch sensor 204 due to a parasitic capacitance between the display panel and the touch sensing panel. Capacitor 208 is coupled between the TX touch sensor 202 and the $V_{EE}$ 212. Capacitor 210 is coupled between the TX touch sensor 204 and the $V_{EE}$ 212. Thus, the perturbation at the $V_{EE}$ 212 due to excitation signals transmitted to the TX touch sensors 202 and 204 may lead to the display flicker issue.

Figure 2C:
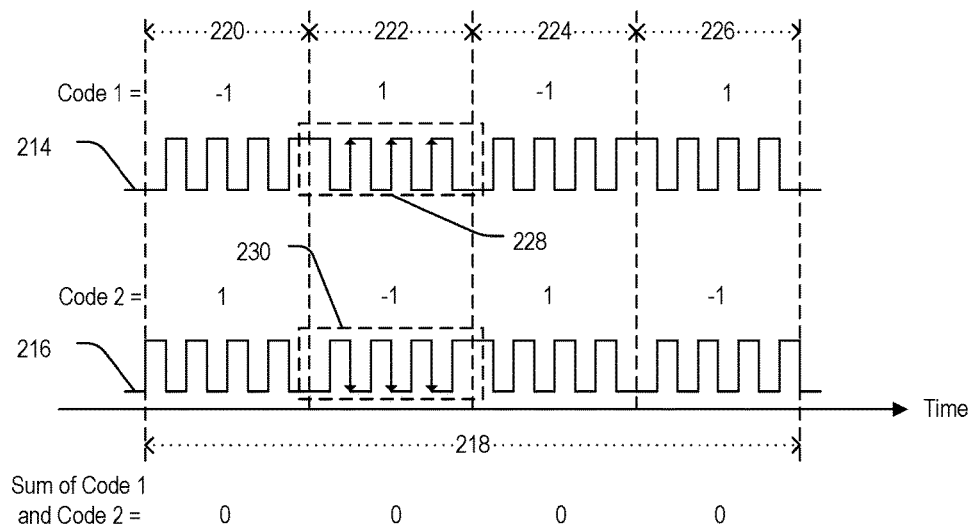
FIG. 2C illustrates excitation signals according to some embodiments.

One way to reduce the interference to the $V_{EE}$ 212 is to apply excitation signals as shown in FIG. 2C. The touchscreen controller may transmit excitation signal 214 to the TX touch sensor 202 and excitation signal 216 to the TX touch sensor 204. Both excitation signals 214 and 216 are Alternating Current (AC) waveforms transmitted during a time frame 218. The time frame 218 has four time slots 220, 222, 224, and 226. The excitation signals 214 and 216 are determined based on two 4×1 codes respectively. The excitation signal 214 is determined based on Code 1=[−1, 1, −1, 1], and the excitation signal 216 is determined based on Code 2=[1, −1, 1, −1]. The excitation signal transmitted during the i-th time slot is determined by the i-th element of the corresponding code. In this example, if the i-th element's value is 1, then the excitation signal in the i-th time slot includes 4 square waveforms 228 (starting with rising edges and ending with falling edges). If the i-th element's value is −1, then the excitation signal in the i-th time slot includes another 4 square waveforms 230 (starting with falling edges and ending with rising edges). In other words, the excitation signal corresponding to value 1 and the excitation signal corresponding to value−1 have a phase difference of 180 degrees.

Thus, when the excitation signal 214 and the excitation signal 216 are simultaneously transmitted to the TX touch sensor 202 and the TX touch sensor 204 respectively, the voltages applied to the capacitors 208 and 210 (as shown in FIG. 2B) tend to cancel out due to the opposite polarity of the excitation signal 214 and the excitation signal 216 (as long as the capacitors 208 and 210 have similar capacitances). As a result, the $V_{EE}$ 212 will experience net zero perturbation, and the display flicker will be reduced, as long as the codes being used to generate the excitation signals have a sum of an all-zero sequence. However, using this code design method, the touchscreen controller may have difficulty in determining the touch strengths merely using output signals received during one single time frame, because Code 1 and Code 2 are not orthogonal (they are proportional to each other based on the design requirement illustrated in FIG. 2C).

It will be appreciated that the examples in FIG. 2C are not intended to be construed in a limiting sense. For example, the codes of any suitable length longer than 4 may be used to generate the excitation signals. FIG. 3 illustrates an example of 8xi codes, whose sum is an all-zero sequence. In another example, the excitation signals may use any suitable number of AC waveforms during each time slot, and the AC waveforms may have some other shapes (e.g., sine waveforms) rather than the square waveforms as shown in FIG. 2C.

The present disclosure provides another code design method to generate excitation signals that may reduce the display flickers. According to a "flicker fusion" concept in the psychophysics of vision, if the flicker happens more frequently, an intermittent light stimulus appears to be steady to an average human observer. For the light stimulus to appear steady, the frequency in which the flicker occurs needs to be larger than a flicker fusion threshold. The flicker fusion threshold may be determined based on multiple factors, such as the illumination intensity, the wavelength range of the illumination, the position on the retina at which the stimulation occurs, and physiological factors such as age and fatigue. A typical flicker fusion threshold is approximately 500 Hertz.

As shown in FIG. 2B, the fluctuations of voltage coupled to the $V_{EE}$ 212 is determined by an aggregation of the excitation signals. Each time the aggregation of the excitation signals switch polarity, the display flicker may occur. In addition, the polarity of each excitation signal during a time slot is determined by the corresponding code. Thus, multiple codes whose sum is a sequence of positive and negative numbers arranged in an alternate way may be used to generate the excitation signals. In other words, every positive element in the sum sequence should be followed by a negative element, and vice-versa. This way, the voltage coupled to the $V_{EE}$ 212 may also switch polarity repeatedly and cause a series of display flickers. However, as long as the elements in the sum sequence switch signs faster than the flicker fusion threshold, the display flickers will appear to be steady to human observers. That is, the human observers will not perceive such display flickers.

FIGS. 4A-4C illustrate examples of the codes configured to generate excitation signals that reduce display flickers based on the flicker fusion theory. FIG. 4A illustrates multiple 8×1 codes. A sum of these codes is a sequence of 4's and −4's arranged in an alternate way. Multiple excitation signals may be generated based on these 8×1 codes in accordance with the method illustrated in FIG. 2C. These multiple excitation signals may be transmitted during a time frame with 8 time slots. In this example, to prevent the human observers from perceiving the display flicker, 8 divided by a period of the time frame may need to be larger than the flicker fusion threshold.

FIG. 4B illustrates a group of 16×1 codes, and FIG. 4C illustrates another group of 16×1 codes. A sum of each group of codes also is a sequence of 4's and −4's arranged in an alternate way. A plurality of excitation signals may be generated based on these 16×1 codes and may be transmitted during a time frame with 16 time slots. In the examples illustrated in FIGS. 4B and 4C, to prevent the human observers from perceiving the display flicker, 16 divided by a period of the time frame may need to be larger than the flicker fusion threshold.

Figure 5:
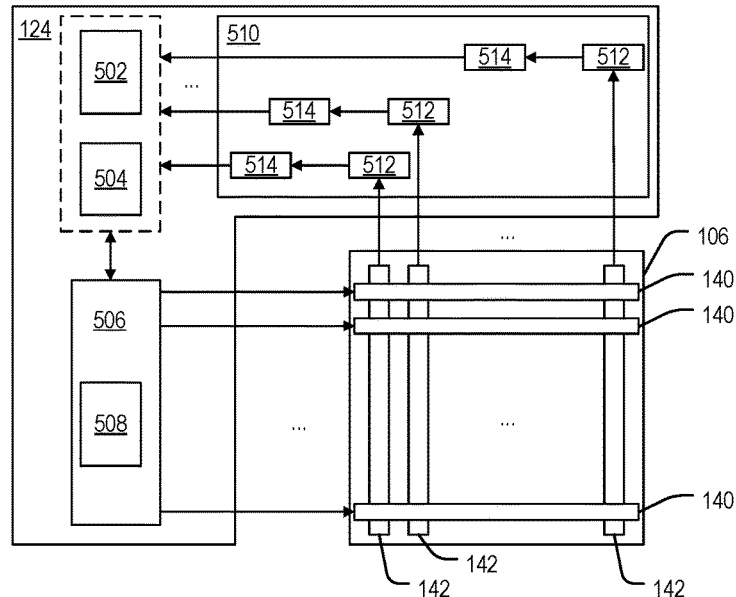
FIG. 5 is a block diagram of a touchscreen controller according to some embodiments.

FIG. 5 is a block diagram of a touchscreen controller 124 according to some embodiments. The touchscreen controller 124 includes a processor 502 and a memory 504. The memory 504 may be non-volatile and may store a program to be executed by the processor 502. The touchscreen controller 124 further includes a TX circuit 506. The TX circuit 506 is coupled to the TX touch sensors 140 of the touch sensing panel 106. In one embodiment, the TX circuit 506 includes a code generation circuit 508. The code generation circuit 508 is configured to produce a plurality of codes described in the present disclosure. In another embodiment, the plurality of codes may be predetermined and stored in the memory 504 and may be accessed by the TX circuit 506. The TX circuit 506 is configured to determine a plurality of excitation signals in accordance with the plurality of codes. In one embodiment, a sum of the plurality of codes is a sequence of integers having a same absolute value and signs alternating between adjacent integers. For example, the vector sum of a plurality of codes [−1, 1, −1, 1] and [−1, 1, −1, 1] is [−2, 2, −2, 2] in which signs alternating between adjacent integers. In another embodiment, the sum of the plurality of codes is an all-zero sequence. The TX circuit 506 is also configured to transmit the plurality of excitation signals to the TX touch sensors 140 simultaneously during a time frame.

The touchscreen controller 124 further includes a RX circuit 510. The RX circuit 510 is coupled to the RX touch sensors 140 of the touch sensing panel 106. The RX circuit 510 may include multiple front end amplifiers 512 and multiple analog-to-digital converters (ADCs) 514. Each RX touch sensor 140 may be coupled to a respective front end amplifier 512, and the respective front end amplifier 512 is further coupled to an ADC 514. The front end amplifier 512 and the ADC 514 are configured to amplify strength of an output signal received from the corresponding RX touch sensor 140. The output signal may be an analog signal. The front end amplifier 512 and the ADC 514 may be configured to further filter the output signal and convert the output signal to a digital signal. The ADC 514 may transmit the converted digital signal to the processor 502 for further processing. The processor 502 is configured to determine touch strengths in accordance with the digital outputs from the RX circuit 510.

In one embodiment, the touchscreen controller may determine a plurality of excitation signals in accordance with a plurality of codes. A sum of the plurality of codes is a sequence of integers having a same absolute value and signs alternating between adjacent integers. The touchscreen controller may transmit each of the plurality of excitation signals to a respective TX touch sensor simultaneously during a time frame. The touchscreen controller may receive a plurality of output signals from the RX touch sensors during the time frame. The touchscreen controller may determine touch strengths in accordance with the plurality of output signals received from the RX touch sensors during the time frame.

In another embodiment, the touchscreen controller may transmit different excitation signals to the TX touch sensors during two or more time frames and determine touch strengths in accordance with output signals received from the RX touch sensor during the two or more time frames. For example, the touchscreen controller may determine a first plurality of excitation signals in accordance with a first plurality of codes. A sum of the first plurality of codes is a sequence of integers having a same absolute value and signs alternating between adjacent integers. The touchscreen controller may transmit each of the first plurality of excitation signals to a respective TX touch sensor simultaneously during a first time frame. The touchscreen controller may receive a first plurality of output signals from the RX touch sensors during the first time frame. The touchscreen controller may determine a second plurality of excitation signals in accordance with a second plurality of codes. A sum of the second plurality of codes is either an all-zero sequence or another sequence of integers having the same absolute value and signs alternating between adjacent integers. The touchscreen controller may transmit each of the second plurality of excitation signals to a respective TX touch sensor simultaneously during a second time frame. The touchscreen controller may receive a second plurality of output signals from the RX touch sensors during the second time frame. Then, the touchscreen controller may determine touch strengths in accordance with both the first plurality of output signals and the second plurality of output signals.

In various embodiments, the touchscreen controller may determine the touch strengths by combining the first plurality of output signals and the second plurality of output signals in accordance with the first plurality of codes and the second plurality of codes.

Figure 6:
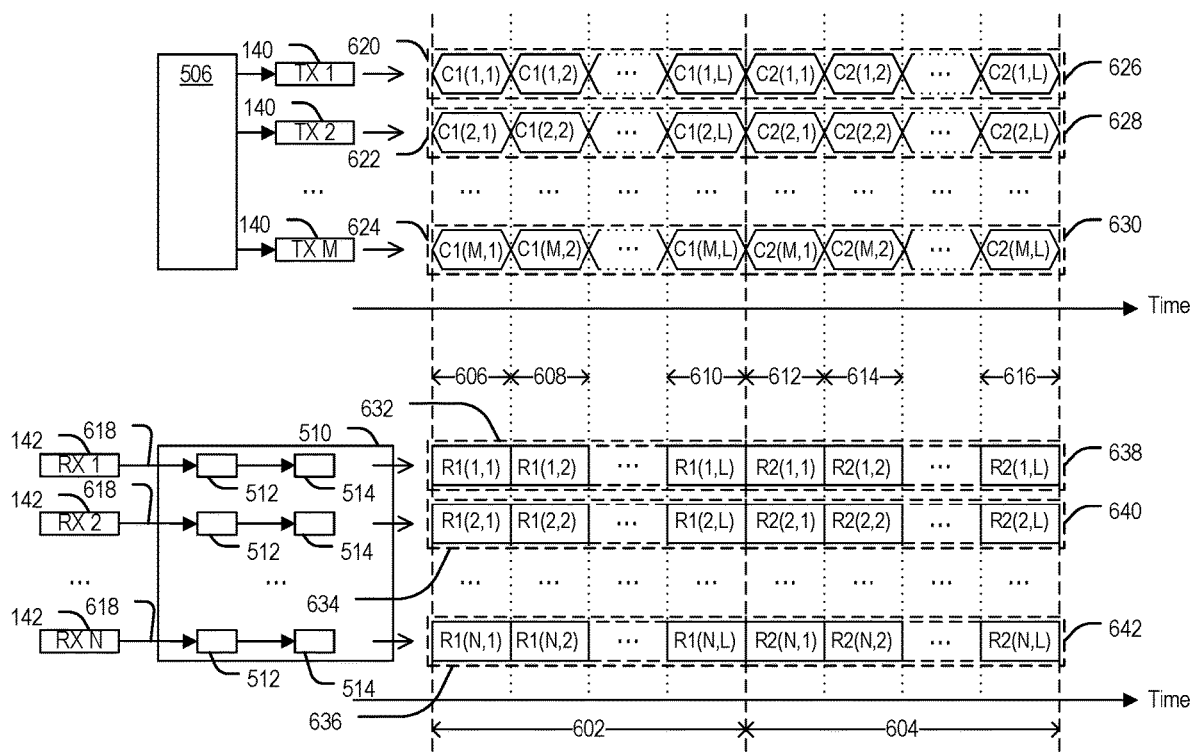
FIG. 6 illustrates transmission of excitation signals and a process to determine touch strengths according to some embodiments.

FIG. 6 illustrates transmission of excitation signals and a process to determine touch strengths according to some embodiments. As shown in FIG. 6, the TX circuit 506 of the touchscreen controller is coupled to M TX touch sensors 140 (TX 1, TX 2, . . . , TX M). The TX circuit 506 is configured to determine a first set of M excitation signals (620, 622, . . . , 624) for time frame 602 based on a M×L matrix C1. The i-th excitation signal in the first set is determined according to code C1[i, :] (the i-th row of matrix C1). The TX circuit 506 is configured to determine a second set of M excitation signals (626, 628, . . . , 630) for time frame 604 based on another M×L matrix C2. The i-th excitation signal in the second set is determined according to code C2[i, :]. In various embodiments, the excitation signals (620, 622, . . . , 624, 626, 628, . . . , 630) may be AC waveforms determined in a manner depicted in FIG. 2C. Both time frames 602 and 604 have L time slots (time slots 606, 608, . . . , 610 in the time frame 602 and time slots 612, 614, . . . , 616 in the time frame 604). The first set of excitation signals (620, 622, . . . , 624) are transmitted simultaneously through the TX touch sensors (TX 1, TX 2, . . . , TX M) during the time frame 602, and the second set of excitation signals (626, 628, . . . , 630) are transmitted simultaneously through the TX touch sensors (TX 1, TX 2, . . . , TX M) during the time frame 604.

The RX circuit 510 of the touchscreen controller is coupled to N RX touch sensors 142 (RX 1, RX 2, . . . , RX N). The RX touch sensors RX 1, RX 2, . . . , RX N may receive outputs signals 618, which are responses triggered by the excitation signals (620, 622, . . . , 624, 626, 628, . . . , 630). Each output signal 618 may go through the front end amplifier 512 and the ADC 514 of the RX circuit 510. Thus, the RX circuit 510 may be configured to demodulate the output signals 618 and determine N demodulated signals (632, 634, . . . , 636) in the time frame 602 and N demodulated signals (638, 640, . . . , 642) in the time frame 604. A N×L matrix R1 may be constructed by using the data of the n-th demodulated signal received in the 1-th time slot of the time frame 602 as an element at the n-th row and the 1-th column. Another N×L matrix R2 may be constructed by using the data of the n-th demodulated signal received in the 1-th time slot of the time frame 604 as an element at the n-th row and the 1-th column.

In various embodiments, the touchscreen controller 124 may be configured to determine touch strengths based on mutual capacitances computed using the matrix R1, the matrix R2, the code matrix C1, and the code matrix C2. Let the [i, j]-th element (i-th row and the j-th column) of a M×N matrix X denote the mutual capacitance between the i-th TX touch sensor (TX i) and the j-th RX touch sensor (RX j). The matrix X may be determined as: $X=1/L(C1 \times R1^T + C2 \times R2^T)$, where $A^T$ is a transpose of a matrix A.

In various embodiments, elements of the 1×L codes C1(1, :), C1(2, :), . . . , C1(M, :) are either 1 or −1. A sum of the codes C1(1, :), C1(2, :), . . . , C1(M, :) is a 1×L vector S1, whose elements are integers having a same absolute value and signs alternating between adjacent integers. L divided by a period of the time frame 602 may be larger than a flicker fusion threshold.

In various embodiments, elements of the 1×L codes C2(1, :), C2(2, :), . . . , C2(M, :) also are either 1 or −1. In one embodiment, a sum of the codes C2(1, :), C2 (2, :), . . . , C2(M, :) is a 1×L vector, whose elements are 0. Alternatively, the sum of the codes C2(1, :), C2(2, :), . . . , C2(M, :) may be another 1×L vector S2, whose elements are integers having a same absolute value and signs alternating between adjacent integers. L divided by a period of the time frame 604 may be larger than a flicker fusion threshold.

Although two time frames are illustrated in FIG. 6, this is not indicative of the number of time frames that may be required by the techniques described in the present disclosure. Any suitable number of time frames (such as one or more than two) and any suitable methods known in the art to determine the touch strengths by combining the output signals received during the one or more time frames may be used by the touchscreen controller.

Figure 7A:
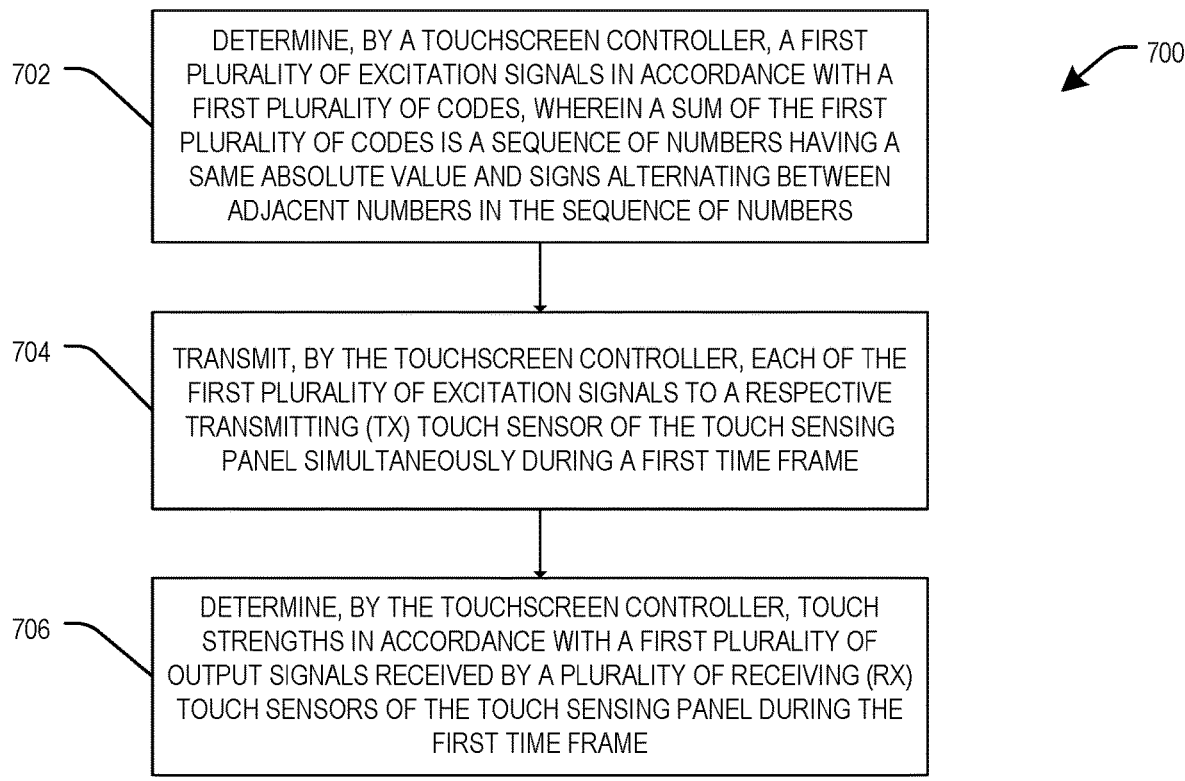
FIGS. 7A-7B illustrate a method performed by a touchscreen controller according to some embodiments.
Figure 7B:
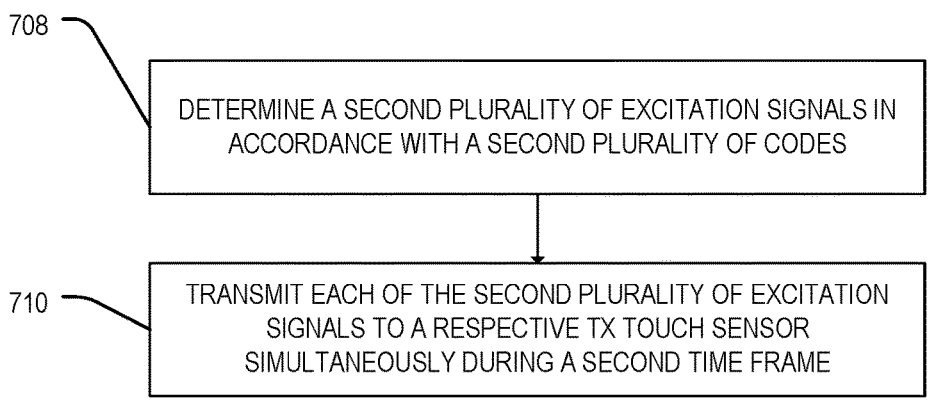

FIGS. 7A-7B illustrate a method 700 performed by a touchscreen controller to operate a touch sensing panel according to some embodiments. As shown in FIG. 7A, the method 700 includes three steps 702, 704, and 706. At step 702, the touchscreen controller determines a first plurality of excitation signals in accordance with a first plurality of codes. A sum of the first plurality of codes is a sequence of integers having a same absolute value and signs alternating between adjacent integers. At step 704, the touchscreen controller transmits each of the first plurality of excitation signals to a respective TX touch sensor of the touch sensing panel simultaneously during a first time frame. At step 706, the touchscreen controller determines touch strengths in accordance with a first plurality of output signals received by a plurality of RX touch sensors of the touch sensing panel during the first time frame.

Optionally, the method 700 may further include steps 708 and 710 as shown in FIG. 7B. At step 708, the touchscreen controller may determine a second plurality of excitation signals in accordance with a second plurality of codes. At step 710, the touchscreen controller may transmit each of the second plurality of excitation signals to a respective TX touch sensor simultaneously during a second time frame. In various embodiments, the determining the touch strengths at step 706 may include determining the touch strengths in accordance with both the first plurality of output signals received by the plurality of RX touch sensors during the first time frame and the second plurality of output signals received by the plurality of RX touch sensors during the second time frame.

The display driver 126 may use the VSYNC signal to trigger refreshing of each display frame and the HSYNC signal to trigger refreshing of each row of pixels. A pulse in the excitation signals may interfere with the VSYNC signal and the HSYNC signal and thus cause the display flicker. In one embodiment, this issue may be solved if the touchscreen controller refrains from transmitting the first plurality of excitation signals and the second plurality of excitation signals to the plurality of TX touch sensors during a HSYNC pulse and a VSYNC pulse.

Even if a pulse of the excitation signal occurs during a HSYNC pulse or a VSYNC pulse, a human observer may not perceive the display flicker through his or her eyes as long as the co-occurrence does not repeat consistently. In another embodiment, the touchscreen controller may be configured to avoid synchronizing the touch operations and the display refreshing operations. Specifically, to avoid the display flicker caused by the co-occurrence of the pulses in the excitation signals and the HSYNC pulses and the VSYNC pulses, the frequencies of the excitation signals and the HSYNC and VSYNC signals may be selected as a non-integer multiple of each other.

Example embodiments of the invention are summarized here. Other embodiments can also be understood from the entirety of the specification as well as the claims filed herein.

Example 1. A method for operating a touch sensing panel, the method comprising determining, by a touchscreen controller, a first plurality of excitation signals in accordance with a first plurality of codes, wherein a sum of the first plurality of codes is a sequence of numbers having a same absolute value and signs alternating between adjacent numbers in the sequence of numbers; transmitting, by the touchscreen controller, each of the first plurality of excitation signals to a respective TX touch sensor of the touch sensing panel simultaneously during a first time frame; and determining, by the touchscreen controller, touch strengths in accordance with a first plurality of output signals received by a plurality of RX touch sensors of the touch sensing panel during the first time frame.

Example 2. The method of Example 1, wherein the first plurality of codes are vectors of length L, L being a positive integer, wherein elements of the vectors are either a positive value "X" or a negative value "−X," and wherein L divided by a period of the first time frame is larger than a flicker fusion threshold.

Example 3. The methods of Example 1 and Example 2, wherein the first time frame includes L time slots, and wherein each of the first plurality of excitation signals to be transmitted during the i-th time slot is either a square waveform when the i-th element of a corresponding code is X or the square waveform phase shifted by 180 degrees when the i-th element of a corresponding code is −X.

Example 4. The methods of Example 1 through Example 3, wherein the flicker fusion threshold is approximately 500 Hertz.

Example 5. The methods of Example 1 through Example 4, further comprising determining a second plurality of excitation signals in accordance with a second plurality of codes; transmitting each of the second plurality of excitation signals to a respective TX touch sensor simultaneously during a second time frame; and determining the touch strengths in accordance with both the first plurality of output signals and a second plurality of output signals received by the plurality of RX touch sensors during the second time frame.

Example 6. The methods of Example 1 through Example 5, wherein a sum of the second plurality of codes is either an all-zero sequence or another sequence of numbers having the same absolute value and signs alternating between adjacent numbers.

Example 7. The methods of Example 1 through Example 6, wherein the touch strengths are determined by combining the first plurality of output signals and the second plurality of output signals in accordance with the first plurality of codes and the second plurality of codes.

Example 8. The methods of Example 1 through Example 7, further comprising refraining from transmitting the first plurality of excitation signals and the second plurality of excitation signals to TX touch sensors of the touch sensing panel during a HSYNC pulse and a VSYNC pulse.

Example 9. The methods of Example 1 through Example 8, wherein the first plurality of codes and the second plurality of codes are either generated by the touchscreen controller or predetermined and stored in a memory of the touchscreen controller.

Example 10. A touchscreen controller coupled to a touch sensing panel, the touchscreen controller comprising a TX circuit configured to transmit a first plurality of excitation signals to a plurality of TX touch sensors of the touch sensing panel simultaneously during a first time frame, wherein the first plurality of excitation signals is determined in accordance with a first plurality of codes, and wherein a sum of the first plurality of codes is a sequence of numbers having a same absolute value and signs alternating between adjacent numbers in the sequence of numbers; and a RX circuit configured to receive a first plurality of output signals from a plurality of RX touch sensors of the touch sensing panel during the first time frame, wherein the touchscreen controller is configured to determine touch strengths in accordance with the first plurality of output signals.

Example 11. The touchscreen controller of Example 10, wherein the first plurality of codes are vectors of length L, L being a positive integer, wherein elements of the vectors are either a positive value "X" or a negative value "−X," and wherein L divided by a period of the first time frame is larger than a flicker fusion threshold.

Example 12. The touchscreen controllers of Example 10 and Example 11, wherein the first time frame includes L time slots, and wherein each of the first plurality of excitation signals to be transmitted during the i-th time slot is either a square waveform when the i-th element of a corresponding code is X or the square waveform phase shifted by 180 degrees when the i-th element of a corresponding code is −X.

Example 13. The touchscreen controllers of Example 10 through Example 12, wherein the flicker fusion threshold is approximately 500 Hertz.

Example 14. The touchscreen controllers of Example 10 through Example 13, wherein the TX circuit is further configured to transmit a second plurality of excitation signals to the plurality of TX touch sensors simultaneously during a second time frame, the second plurality of excitation signals being determined in accordance with a second plurality of codes, wherein the RX circuit is further configured to receive a second plurality of output signals from the plurality of RX touch sensors during the second time frame, and wherein the touchscreen controller is configured to determine the touch strengths in accordance with both the first plurality of output signals and the second plurality of output signals.

Example 15. The touchscreen controllers of Example 10 through Example 14, wherein a sum of the second plurality of codes is either an all-zero sequence or another sequence of numbers having the same absolute value and signs alternating between adjacent numbers.

Example 16. The touchscreen controllers of Example 10 through Example 15, configured to determine the touch strengths by combining the first plurality of output signals and the second plurality of output signals in accordance with the first plurality of codes and the second plurality of codes.

Example 17. The touchscreen controllers of Example 10 through Example 16, wherein the TX circuit refrains from transmitting the first plurality of excitation signals and the second plurality of excitation signals to the plurality of TX touch sensors during a HSYNC pulse and a VSYNC pulse.

Example 18. The touchscreen controllers of Example 10 through Example 17, further comprising a memory, wherein the first plurality of codes and the second plurality of codes are predetermined and stored in the memory.

Example 19. The touchscreen controllers of Example 10 through Example 18, further comprising a code generation circuit configured to determine the first plurality of codes and the second plurality of codes.

Example 20. An electronic device comprising a touch sensing panel including a plurality of TX touch sensors and a plurality of RX touch sensors, and a touchscreen controller coupled to the touch sensing panel, the touchscreen controller including: a TX circuit configured to transmit a first plurality of excitation signals to the plurality of TX touch sensors simultaneously during a first time frame, wherein the first plurality of excitation signals is determined in accordance with a first plurality of codes, and wherein a sum of the first plurality of codes is a sequence of numbers having a same absolute value and signs alternating between adjacent numbers; and a RX circuit configured to receive a first plurality of output signals from the plurality of RX touch sensors during the first time frame, wherein the touchscreen controller is configured to determine touch strengths in accordance with the first plurality of output signals.

Example 21. The electronic device of Example 20, wherein the first plurality of codes are vectors of length L, L being a positive integer, wherein elements of the vectors are either a positive value "X" or a negative value "−X," and wherein L divided by a period of the first time frame is larger than a flicker fusion threshold.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for operating a touch sensing panel, the method comprising:
   determining, by a touchscreen controller, a first plurality of excitation signals in accordance with a first plurality of codes, wherein a sum of the first plurality of codes is a sequence of numbers having a same absolute value and signs alternating between adjacent numbers in the sequence of numbers, wherein the first plurality of codes are vectors of length L, L being a positive integer, wherein elements of the vectors are either a positive value "X" or a negative value "−X";
   transmitting, by the touchscreen controller, each of the first plurality of excitation signals to a respective transmitting (TX) touch sensor of the touch sensing panel simultaneously during a first time frame, wherein L divided by a period of the first time frame is larger than a flicker fusion threshold; and
   determining, by the touchscreen controller, touch strengths in accordance with a first plurality of output signals received by a plurality of receiving (RX) touch sensors of the touch sensing panel during the first time frame.

2. The method of claim 1, wherein the first time frame includes L time slots, and wherein each of the first plurality of excitation signals to be transmitted during the i-th time slot is either a square waveform when the i-th element of a corresponding code is X or the square waveform phase shifted by 180 degrees when the i-th element of a corresponding code is −X.

3. The method of claim 1, wherein the flicker fusion threshold is approximately 500 Hertz.

4. The method of claim 1, further comprising:
   determining a second plurality of excitation signals in accordance with a second plurality of codes;
   transmitting each of the second plurality of excitation signals to a respective TX touch sensor simultaneously during a second time frame; and
   determining the touch strengths in accordance with both the first plurality of output signals and a second plurality of output signals received by the plurality of RX touch sensors during the second time frame.

5. The method of claim 4, wherein a sum of the second plurality of codes is either an all-zero sequence or another sequence of numbers having the same absolute value and signs alternating between adjacent numbers.

6. The method of claim 4, wherein the touch strengths are determined by combining the first plurality of output signals and the second plurality of output signals in accordance with the first plurality of codes and the second plurality of codes.

7. The method of claim 4, further comprising:
refraining from transmitting the first plurality of excitation signals and the second plurality of excitation signals to TX touch sensors of the touch sensing panel during a horizontal synchronization (HSYNC) pulse and a vertical synchronization (VSYNC) pulse.

8. The method of claim 4, wherein the first plurality of codes and the second plurality of codes are either generated by the touchscreen controller or predetermined and stored in a memory of the touchscreen controller.

9. A touchscreen controller coupled to a touch sensing panel, the touchscreen controller comprising:
a transmitting (TX) circuit configured to transmit a first plurality of excitation signals to a plurality of TX touch sensors of the touch sensing panel simultaneously during a first time frame, wherein the first plurality of excitation signals is determined in accordance with a first plurality of codes, and wherein a sum of the first plurality of codes is a sequence of numbers having a same absolute value and signs alternating between adjacent numbers in the sequence of numbers, wherein the first plurality of codes are vectors of length L, L being a positive integer, wherein elements of the vectors are either a positive value "X" or a negative value "−X," and wherein L divided by a period of the first time frame is larger than a flicker fusion threshold; and
a receiving (RX) circuit configured to receive a first plurality of output signals from a plurality of RX touch sensors of the touch sensing panel during the first time frame, wherein the touchscreen controller is configured to determine touch strengths in accordance with the first plurality of output signals.

10. The touchscreen controller of claim 9, wherein the first time frame includes L time slots, and wherein each of the first plurality of excitation signals to be transmitted during the i-th time slot is either a square waveform when the i-th element of a corresponding code is X or the square waveform phase shifted by 180 degrees when the i-th element of a corresponding code is −X.

11. The touchscreen controller of claim 9, wherein the flicker fusion threshold is approximately 500 Hertz.

12. The touchscreen controller of claim 9, wherein the TX circuit is further configured to transmit a second plurality of excitation signals to the plurality of TX touch sensors simultaneously during a second time frame, the second plurality of excitation signals being determined in accordance with a second plurality of codes, wherein the RX circuit is further configured to receive a second plurality of output signals from the plurality of RX touch sensors during the second time frame, and wherein the touchscreen controller is configured to determine the touch strengths in accordance with both the first plurality of output signals and the second plurality of output signals.

13. The touchscreen controller of claim 12, wherein a sum of the second plurality of codes is either an all-zero sequence or another sequence of numbers having the same absolute value and signs alternating between adjacent numbers.

14. The touchscreen controller of claim 12, configured to determine the touch strengths by combining the first plurality of output signals and the second plurality of output signals in accordance with the first plurality of codes and the second plurality of codes.

15. The touchscreen controller of claim 12, wherein the TX circuit refrains from transmitting the first plurality of excitation signals and the second plurality of excitation signals to the plurality of TX touch sensors during a horizontal synchronization (HSYNC) pulse and a vertical synchronization (VSYNC) pulse.

16. The touchscreen controller of claim 12, further comprising a memory, wherein the first plurality of codes and the second plurality of codes are predetermined and stored in the memory.

17. The touchscreen controller of claim 12, further comprising a code generation circuit configured to determine the first plurality of codes and the second plurality of codes.

18. An electronic device comprising:
a touch sensing panel including a plurality of transmitting (TX) touch sensors and a plurality of receiving (RX) touch sensors, and
a touchscreen controller coupled to the touch sensing panel, the touchscreen controller including:
a TX circuit configured to transmit a first plurality of excitation signals to the plurality of TX touch sensors simultaneously during a first time frame, wherein the first plurality of excitation signals is determined in accordance with a first plurality of codes, and wherein a sum of the first plurality of codes is a sequence of numbers having a same absolute value and signs alternating between adjacent numbers, wherein the first plurality of codes are vectors of length L, L being a positive integer, wherein elements of the vectors are either a positive value "X" or a negative value "−X," and wherein L divided by a period of the first time frame is larger than a flicker fusion threshold; and
a RX circuit configured to receive a first plurality of output signals from the plurality of RX touch sensors during the first time frame, wherein the touchscreen controller is configured to determine touch strengths in accordance with the first plurality of output signals.

19. The electronic device of claim 18, wherein the flicker fusion threshold is approximately 500 Hertz.

20. The electronic device of claim 18, wherein the first time frame includes L time slots, and wherein each of the first plurality of excitation signals to be transmitted during the i-th time slot is either a square waveform when the i-th element of a corresponding code is X or the square waveform phase shifted by 180 degrees when the i-th element of a corresponding code is −X.

21. The electronic device of claim 18, wherein the TX circuit is further configured to transmit a second plurality of excitation signals to the plurality of TX touch sensors simultaneously during a second time frame, the second plurality of excitation signals being determined in accordance with a second plurality of codes, wherein the RX circuit is further configured to receive a second plurality of output signals from the plurality of RX touch sensors during the second time frame, and wherein the touchscreen controller is configured to determine the touch strengths in accordance with both the first plurality of output signals and the second plurality of output signals.

* * * * *